US012387297B2

(12) United States Patent
Rotscholl et al.

(10) Patent No.: US 12,387,297 B2
(45) Date of Patent: Aug. 12, 2025

(54) METHOD AND DEVICE FOR REDUCING ALIASING ERRORS IN IMAGES OF PIXEL-BASED DISPLAY DEVICES AND FOR THE EVALUATION OF DISPLAY DEVICES OF THIS TYPE

(71) Applicant: TECHNOTEAM HOLDING GMBH, Ilmenau (DE)

(72) Inventors: Ingo Rotscholl, Darmstadt (DE); Udo Krüger, Wünschensuhl (DE); Franz Schmidt, Ilmenau (DE); Heiko-Ulrich Klaus Kempe, Ilmenau (DE)

(73) Assignee: TECHNOTEAM HOLDING GMBH, Ilmenau (DE)

( * ) Notice: Subject to any disclaimer, the term of this patent is extended or adjusted under 35 U.S.C. 154(b) by 417 days.

(21) Appl. No.: 18/005,667

(22) PCT Filed: Apr. 8, 2021

(86) PCT No.: PCT/EP2021/059168
§ 371 (c)(1),
(2) Date: Jan. 16, 2023

(87) PCT Pub. No.: WO2022/012789
PCT Pub. Date: Jan. 20, 2022

(65) Prior Publication Data
US 2023/0281758 A1    Sep. 7, 2023

(30) Foreign Application Priority Data
Jul. 17, 2020    (DE) .................... 10 2020 208 974.4

(51) Int. Cl.
*G06T 5/70*    (2024.01)
*G06T 5/10*    (2006.01)
(Continued)

(52) U.S. Cl.
CPC .............. *G06T 5/70* (2024.01); *G06T 5/10* (2013.01); *G06T 5/20* (2013.01); *G09G 3/006* (2013.01);
(Continued)

(58) Field of Classification Search
CPC .... G06T 5/70; G06T 5/10; G06T 5/20; G06T 2200/12; G06T 2207/10024; G06T 5/50;
(Continued)

(56) References Cited

U.S. PATENT DOCUMENTS 5,764,209 A  *  6/1998  Hawthorne .............. G09G 3/20
                                                    345/87
5,969,757 A     10/1999  Okada et al.
(Continued)

FOREIGN PATENT DOCUMENTS

CN    101918818 A  * 12/2010  ........... G01N 21/956
CN    104704822 A  *  6/2015  ............. G09G 3/006
(Continued)

OTHER PUBLICATIONS

Germany Office Action, mailing date May 17, 2021 for corresponding German Application No. DE 10 2020 208 974.4 with English translation (9 pages).
(Continued)

*Primary Examiner* — Jose L Couso
(74) *Attorney, Agent, or Firm* — Intellectual Property Law Group LLP

(57)    ABSTRACT

The invention relates to a method for reducing aliasing errors in a moire-corrected final image formed by at least one camera image, wherein the at least one camera image is captured, by a camera (1) having imaging optics (1.1) and a sensor surface (1.2) with sensor pixels (1.3), as the depiction of a display image of a display device (2) with display pixels (2.1) arranged in a matrix-like manner and spaced apart in
(Continued)

Figure 1:
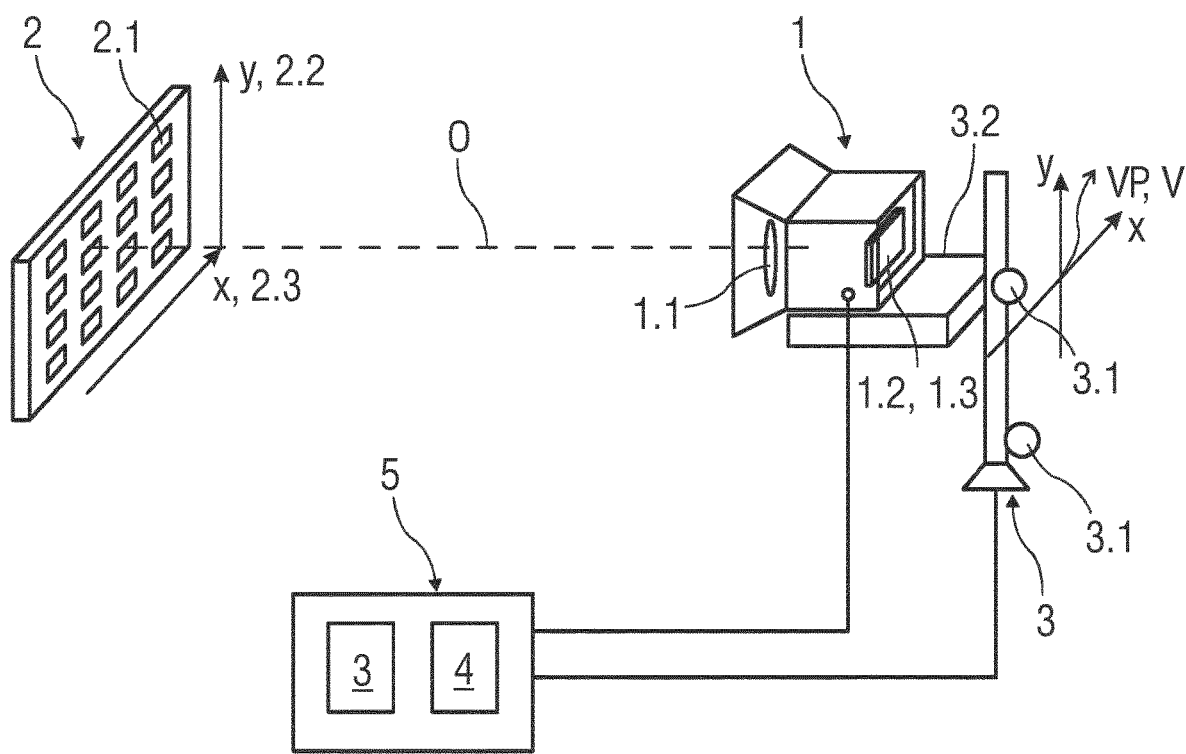

a display pixel pitch (D A) on the sensor surface (1.2), wherein, during the capture, the camera (1) is shifted relative to the display device (2) along at least one offset path (VP) in relation to a starting position (S). The invention also relates to a method for evaluating the presentation quality of a pixel-based display device (2), and a device for carrying out methods of this type.

19 Claims, 5 Drawing Sheets

(51) Int. Cl.
    *G06T 5/20*     (2006.01)
    *G09G 3/00*     (2006.01)

(52) U.S. Cl.
    CPC .............. *G06T 2200/12* (2013.01); *G06T 2207/10024* (2013.01)

(58) Field of Classification Search
    CPC . G06T 2207/20004; G06T 2207/20024; G06T 5/73; G06T 7/0004; G09G 3/006; G09G 2360/16; G09G 2320/0233; G09G 2300/0819; G09G 2320/029; G09G 2320/0295; G09G 2320/0693; G09G 2340/0464; G09G 3/3225; G09G 2360/147; H04N 23/58; H04N 17/002; H04N 23/81; H04N 25/11; H04N 17/04; H04N 5/77; H04N 25/48; H04N 5/21; H04N 5/225; H04N 23/67; H04N 25/671; G03B 2205/0038; G03B 5/00; G02B 27/60; G02B 27/64; G02B 27/646; G01M 11/00; G01M 11/02; G01M 11/0207; G01M 11/064
See application file for complete search history.

(56) References Cited

U.S. PATENT DOCUMENTS

| | | | | |
|---|---|---|---|---|
| 6,831,995 | B1 * | 12/2004 | Asano | ................... G06T 7/0004 |
| | | | | 345/698 |
| 7,705,883 | B2 | 4/2010 | Stavely et al. | |

FOREIGN PATENT DOCUMENTS

| | | | | |
|---|---|---|---|---|
| CN | 106664359 A | * | 5/2017 | ............ G01M 11/00 |
| EP | 1860492 A1 | | 11/2007 | |
| EP | 2097783 A1 | | 9/2009 | |
| JP | 2000338000 A | * | 12/2000 | ........... G06T 7/0004 |
| JP | 3245731 B2 | * | 1/2002 | .......... G06F 11/2221 |
| JP | 2002174564 A | * | 6/2002 | ............. H04N 17/04 |
| JP | 3617887 B2 | * | 2/2005 | ............. H04N 23/84 |
| JP | 2005072816 A | | 3/2005 | |
| JP | 3755375 B2 | | 3/2006 | |
| JP | 2008035241 A | | 2/2008 | |
| JP | 2009147925 A | * | 7/2009 | ........... G01N 21/956 |
| JP | 2014174803 A | | 9/2014 | |
| JP | WO 2018/146765 | | 8/2018 | |
| KR | 950005024 B1 | * | 5/1995 | ............. H04N 17/04 |
| KR | 100397080 B1 | * | 11/2004 | ............. G09G 3/006 |

OTHER PUBLICATIONS

International Search Report, dated Jun. 21, 2021 for corresponding International Application No. PCT/EP2021/059168 with English translation (6 pages).
Written Opinion of the ISA, mailing date Jun. 21, 2021 for corresponding International Application No. PCT/EP2021/059168 with English translation (12 pages).

* cited by examiner

METHOD AND DEVICE FOR REDUCING ALIASING ERRORS IN IMAGES OF PIXEL-BASED DISPLAY DEVICES AND FOR THE EVALUATION OF DISPLAY DEVICES OF THIS TYPE

CROSS-REFERENCE TO RELATED APPLICATIONS

This application is a U.S. National Phase application, under 35 U.S.C. § 371, of International Application no. PCT/EP2021/059168 with an international filing date of Apr. 8, 2021, and claims benefit of German Application no. 10 2020 208 974.4 filed on Jul. 17, 2020, each of which is hereby incorporated by reference for all purposes.

FIELD OF INVENTION

The invention relates to a method for suppressing aliasing errors in a Moiré-corrected result image formed from at least one camera image taken by means of a camera from a display image displayed by a pixel-based display device having display pixels arranged in a matrix-like manner.

The invention further relates to a method for evaluating the display quality of a pixel-based display device on the basis of at least one result image formed in this way.

Furthermore, the invention relates to an apparatus for carrying out such methods.

BACKGROUND

When recording a display image, which is displayed by a display device with matrix-like arranged display pixels, by means of a camera comprising a sensor with matrix-like arranged sensor pixels, artifacts caused by aliasing can occur, which are referred to as Moiré interference, Moiré phenomenon or Moiré for short. Such aliasing errors occur in particular when the pixel pitch, i.e.: the distance between the center of a first pixel to the center of an adjacent second pixel, for the sensor pixels of the camera is approximately equal to the pixel pitch adapted to the image scale for the display pixels of the display device.

The image-side image scale $\beta'$ is defined as the ratio of an extent s of an object on the display image to the extent s' of the image of that object on the sensor of the camera:

$$\beta' = \frac{s'}{s}.$$

It is known that Moiré can be avoided for special measurement arrangements, in particular for mapping exactly one display pixel onto exactly one (or a fixed integer number of) sensor pixels. However, due to image distortions caused by the camera lens and the required precise alignment between the camera and the display device, these measurement arrangements are practically difficult to achieve.

Furthermore, it is known from documents JP2008035241A, U.S. Pat. No. 7,705,883B2 and EP2097783A1 that Moiré interference can be reduced by moving at least one optical element, for example a sensor of a camera relative to other elements in the camera. Document U.S. Pat. No. 7,705,883B2 describes an apparatus and method for suppressing aliasing or Moiré interference using image stabilization units of cameras. In an exemplary embodiment, the method includes sensing a camera movement, sensing an image captured by the camera, and moving at least one optical element in the camera during exposure of the image both to stabilize the image and to suppress aliasing or Moiré interference in the image.

In such methods, the movement of optical elements relative to the sensor inside the camera is geared to the pixel pitch of the sensor and also occurs on the order of the Nyquist frequency of the sensor pixels.

It is also known that Moiré interference can be mitigated or avoided by optical defocusing, i.e.: slightly out-of-focus imaging of the display image onto the camera's sensor by means of the camera lens. However, this is accompanied by a loss of effective spatial resolution of the camera image. Aliasing errors, which appear as incorrectly occurring very low spatial frequencies (i.e., spatial frequencies far below the Nyquist spatial frequency determined by the camera's sensor), are difficult to detect by optical defocusing and are often not or not completely avoidable. The occurrence and position (i.e.: the assigned spatial frequency in the frequency space of the camera) for such aliasing errors, however, depends not only on the pixel pitch of the sensor pixels, but also on the pixel pitch of the display pixels. In particular, the occurrence and position of such aliasing errors depend on the ratio of the pixel pitches of the display device and the camera.

Typically, aliasing errors occur particularly severely when the ratio of the pixel pitch of the camera's sensor pixels to the pixel pitch of the display pixels, which is corrected for the camera's magnification (the magnification) and is referred to as the reproduction scale (RPS), lies in a range greater than 1 and less than 2. In principle, however, aliasing errors are also possible at any RPS below and above 1, for example at an RPS 3 or 4.

If the pixel pitch of the sensor pixels of the camera is denoted by $D_S$ and the pixel pitch of the display pixels is denoted by $D_A$, the RPS is given as $$RPS = \frac{D_S}{\beta' D_A}.$$

In addition, aliasing errors are affected by the shape and aperture of the display pixels. For example, a display device with square display pixels equally spaced in the vertical and horizontal directions will cause different Moiré interference than a display device with the same display pixel pitch but rectangular shaped display pixels. Also, if the display pixel pitch in the vertical direction (column direction) is chosen differently from the display pixel pitch in the horizontal direction (row direction), a different Moiré interference may be caused. Therefore, there is a need for a correction method for Moiré interference that is specifically adaptable to a display device.

A reduction of Moiré interference similar to defocusing can also be achieved by smoothing filtering of a camera image. Low-pass filters for filtering the camera image in position space are known. However, such smoothing also causes a loss of effective spatial resolution and cannot reliably suppress very low aliasing spatial frequencies.

Furthermore, it is possible to transform camera images, for example by a two-dimensional discrete Fourier transform, into a frequency space and to eliminate or suppress erroneous frequency components generated in the frequency space by aliasing. From such a cleaned frequency space representation, a cleaned image can be generated by transforming back into position space, in which Moiré interference is suppressed. However, this method cannot eliminate erroneous frequency components (caused by aliasing) that are indistinguishable in frequency and power from possible spatial frequencies that are actually present. For example, very low aliased spatial frequencies cannot or only incompletely be distinguished from correctly recorded spatial frequencies caused by a locally non-uniform luminance of a (homogeneously driven) display.

From the document JP 3755375 B2 a method for the suppression of Moiré interference in camera images taken by an electronic display is known. In this method, a plurality of camera images is recorded by means of a camera. Between the recording of the individual camera images, the camera is offset relative to the display relative to the starting position, in which a first camera image is taken, in the vertical direction (that is: along the columns of the display pixels arranged in a matrix-like manner) and/or in the horizontal direction (that is: along the rows of the display pixels arranged in a matrix-like manner), the offset in each direction being half the pixel pitch of the electronic display.

A Moiré-corrected result image is generated from the individual camera images taken in this manner by averaging.

Document U.S. Pat. No. 6,831,995 B1 further discloses that a plurality of $n^2$ camera images are captured, each camera image being captured at a respective fixed capture position for the capture duration of a single camera image. The shooting positions are arranged in a grid-like staggered manner in a square or rectangle whose vertical/horizontal extent is equal to the vertical/horizontal display pixel pitch. Document U.S. Pat. No. 6,831,995 B1 proposes to generate an n-times oversampled composition image from the plurality of these camera images and to reduce or eliminate Moiré interference therein by sliding averaging.

Document JP 2014 174803 A describes a method for removing Moiré noise from images by performing a two-dimensional Fourier transform and extracting frequency components associated with low spatial frequencies. Other frequency components associated with comparatively higher spatial frequencies are removed. The Fourier transform thus modified is transformed back into the spatial domain.

The document WO 2018/146765 A1 describes a method for Moiré suppression without affecting the image resolution. From a first, defocused image, frequency components associated with low spatial frequencies are extracted in the Fourier domain. From a second, non-defocused image, frequency components associated with high spatial frequencies are extracted in the Fourier domain. The frequency components taken from the first and second images are combined and transformed back into the spatial domain.

SUMMARY OF INVENTION

The object of the invention is to provide an improved method for suppressing aliasing errors in a Moiré-corrected result image formed from at least one camera image.

Further, the object of the invention is to provide an improved method for evaluating the display quality of a pixel-based display device.

Further, the object of the invention is to provide a device for carrying out one of these methods.

This object is achieved according to the invention by the methods and device as specified in the appended claims.

In a method for suppressing aliasing errors, a Moiré-corrected result image is formed from at least one camera image. The at least one camera image is captured by a camera comprising imaging optics and a sensor surface having sensor pixels as an image of a display image, which is imaged onto the sensor surface by a display device having display pixels arranged in a matrix-like fashion. The display pixels are spaced apart by a display pixel pitch. The display pixel pitch is the distance from the center of a display pixel to the center of a respective nearest other display pixel.

According to the invention, the camera is moved relative to the display device along at least one offset path while capturing at least one camera image.

When the camera is moved relative to the display device during a camera image capture period $0 \le t \le T$, the projection of an imaginary or real point of the display image, for example the center of an approximately centered display pixel, onto the sensor surface of the camera generally changes.

The time-dependent locus of the camera's movement:

$$x(t)=x_0+\delta_x(t)$$

$$y(t)=y_o+\delta_y(t)$$

is referred to as the offset path, where $x_o$, $y_o$ denote the coordinates of the camera in the x-direction and y-direction at the beginning of the recording of the camera image, and $\delta_x(t)$, $\delta_y(t)$ denote the displacement in the x-direction and y-direction that occurred in contrast during the exposure.

The coordinates x,y are specified with respect to a coordinate system selected stationary to the display device.

The length of such an offset path:

$$L=\int_{t=0}^{T}\sqrt{\dot{x}(t)^2+\dot{y}(t)^2}dt$$

is referred to as the offset.

Related to a world coordinate system independent of the camera and the display device, the offset can be achieved by moving the camera and/or by moving the display device relative to the world coordinate system. In other words: the coordinate system for x,y related to the display device can be stationary or likewise movable with respect to the world coordinate system; for the description of the offset path only the relative movement between the camera and the display device is important. In the following, "movement of the camera" therefore always refers to a relative movement related to the display device, which can also be achieved partially or completely by a movement of the display device relative to a world coordinate system.

Preferably, when the camera is moved, its orientation relative to the display device is approximately maintained. However, it is known to the skilled person that panning the camera or the display device by very small panning angles α, for which the approximation $\sin(\alpha) \approx \alpha$ applies, is practically equivalent to a translation. Therefore, if the distance between the camera and the display device is large enough, it is also possible to induce an offset by panning the camera or the display device.

The display device generates a two-dimensional luminance distribution $l(x', y')$ depending on the aperture of the display pixels and the imaging optics of the camera in the plane of the sensor surface, where $x'$, $y'$ describe two mutually orthogonal coordinates in the plane of the sensor surface. This luminance distribution is captured depending on the aperture of the sensor pixels according to a two-dimensional sensitivity distribution function $s(x', y')$ of the sensor pixels (across the plane of the sensor surface).

With the camera and display device in a fixed arrangement relative to each other, the two-dimensional gray value distribution function $g(x', y')$ of a camera image over the continuous spatial coordinates $x'$, $y'$ in the sensor area can thus be specified by multiplying the luminance distribution $l(x', y')$ point by point by the sensitivity distribution function $s(x', y')$:

$$g(x',y')=l(x',y')\cdot s(x',y').$$

This gray value distribution function is integrated over the sensor area and provides the signal value of the sensor pixel. This can be described as convolving the luminance distribution with the pixel sensitivity and then sampling at the sensor pixel locations. This sampling is known to cause Moiré interference, especially when the pixel pitches of the display pixels and the sensor pixels are the same or similar in size.

By moving the camera during the exposure of a single camera image in time 0≤t≤T, a single point of the display image is mapped onto a plurality of points of the sensor surface. The totality of these points can be viewed as the motion-induced point spread function (PSF) h(x', y').

For example, for a camera motion (translation or panning by a very small panning angle) resulting in a uniform linear motion of such a mapped point by $\Delta_x$ in the x' direction, the point response results in $$h(x', y') = \begin{cases} \frac{1}{T} \text{ für } x_0' \leq x' \leq x_0' + \Delta_x, y' = y_0' \\ 0 \text{ otherwise} \end{cases}$$

Accordingly, a corrected gray scale distribution function g'(x', y') in the sensor area of the camera is obtained by convolution with the motion induced PSF $$g'(x',y') = \int_{-\infty}^{\infty} \int_{-\infty}^{\infty} g(x'-\xi, y'-\nu) \cdot h(\xi,\nu) d\xi d\nu$$

The Fourier transform of the motion-induced PSF $H(\omega_x, \omega_y)$ generally exhibits low-pass character, but depends on the spatial course as well as the length of the offset path. For example, with an offset only in the (horizontal) x-direction, only high horizontal spatial frequencies are attenuated, whereas high vertical spatial frequencies are not.

Surprisingly, it has been found that by moving the camera relative to the display device (offset path) and thereby moving the camera image relative to the display image, Moiré interference is reduced or even eliminated without the disadvantage of significantly reduced effective spatial resolution in the Moiré-corrected result image known from the prior art.

It has been found to be particularly advantageous to select an offset path such that the offset, i.e.: the length of the locus along which the camera is moved relative to the display device, is in the order of magnitude of the display pixel pitch. This makes it possible to capture and evaluate a display image in great detail, in particular resolved to display pixels.

In addition, according to the method of the invention, low spatial frequencies in the display image, which are due, for example, to a non-homogeneous brightness distribution over the display device, are retained. In contrast, low spatial frequencies that are erroneously caused by aliasing are reduced or eliminated by the method.

Another advantage of the method according to the invention is that it can be carried out without elements moving within the camera, for example optical elements moving relative to the sensor chip. This facilitates the calibration of cameras, in particular luminance measurement cameras.

A further advantage of the method according to the invention is that a movement of the camera which serves the suppression of Moiré interference can also be determined without consideration of the image scale β' and without consideration of the sensor pixel pitch only on the basis of the display pixel pitch. However, this is not intended to exclude embodiments in which the imaging scale β' and/or the sensor pixel pitch are additionally used, that is: for further improved suppression of Moiré interference.

With the method according to the invention, a Moiré correction (or suppression of aliasing errors) is possible with particularly few individually recorded camera images. Preferably, Moiré correction is performed using a single recorded camera image. This is particularly advantageous if, due to a low brightness of the display image, a long exposure time must be selected for the recording of a camera image, since a particularly short measurement time can then be achieved with a small number of recorded camera images.

Preferably, the offset path is chosen such that the offset is at most five times the display pixel pitch. It has been found that an offset exceeding this does not or only slightly contribute to the correction of the Moiré interference, but impairs the spatial resolution of the camera image, and thus also of the Moiré-corrected result image formed from it.

In an embodiment of the invention, the Moiré-corrected result image is formed from a plurality of camera images. By moving the camera, an offset path is generated for each camera image, starting from a respective starting point. Between the first and at least one further camera image, the camera is offset relative to the display device so that the starting point associated with the at least one further camera image differs from the starting point associated with the first camera image.

The individual camera images are superimposed, that is summed or averaged pixel by pixel. In an averaging process, different camera images may be weighted differently. It is possible that each of the camera images is captured while the camera is offset from the display device by at least one offset. It is also possible that at least one of the plurality of camera images is captured without moving the camera relative to the display device during its capture (exposure).

The formation of a Moiré-corrected result image from a plurality of camera images offers the advantage that the Moiré-corrected result image has a particularly high spatial resolution, since the offset paths related to a single camera image in each case can have a shorter length (a smaller offset).

In addition, an advantage of this embodiment is that a large number of different offset paths can be approached even with an exposure time that has to be selected very short due to the brightness of the display device and the sensitivity of the camera. Thus, a better Moiré suppression can be achieved.

In an embodiment of the invention, a first camera image, a second camera image, and at least a third or further camera image are recorded.

The first and second camera images are captured as images of structurally identical display images, which are displayed by the same display device. The third camera image may be captured by a structurally identical but different display device than the first and second camera images.

Here and in the following, structurally identical display images are display images that do not differ or differ only insignificantly in their frequency responses. Display images with the same allocation of display pixels are structurally identical.

However, even small variations of gray values (brightness values) in individual display pixels, for example a gray value change in a proportion of at most one percent of all display pixels, do not impair the usability of the first and the second camera image for this embodiment of the method. Such changed display images are also to be understood as structurally identical.

Likewise, the homogeneous slight modification of all or very many display pixels between the recording of the first and the second camera image, for example the addition or subtraction of a very small value compared to the average gray value of both display images and/or the scaling of all gray values with a factor close to one, does not impair the usability of the first and the second camera image for this embodiment of the method. Display images modified in this way are also to be understood as having the same structure.

Generally speaking, two display images are to be considered structurally identical if the difference in the associated camera images caused thereby is significantly smaller than the Moiré interference imposed to the camera images in each case. To determine a difference between camera images (caused by a changed display image or by an imposed Moiré interference), for example, a mean square deviation and/or a maximum deviation in both pixel space and spatial frequency space can be used. In particular, relative differences of 5% or less shall be understood as small.

During the recording of the first camera image as well as during the recording of the at least one third or further camera image, the camera is not moved or only slightly moved with respect to the display device. "Slightly moved" is intended here and hereinafter to mean a movement of the camera that results in a change in position that is significantly less than the display pixel pitch, preferably less than one-third of the display pixel pitch. In particular, "slightly moved" is to be understood as a movement that is not triggered purposefully, but only leads to a relative movement between camera and display device as a result of, for example, unavoidable vibrations.

During the recording of the second camera image, the camera is moved relative to the display device along at least one offset path, as already explained with reference to the previously described embodiments.

The two-dimensional Fourier transforms are determined for the first and second camera images and their magnitude profile (amplitude spectrum) is determined as the first and second magnitude profile, respectively. Preferably, the Fourier transforms are determined as discrete Fourier transforms for discrete (vertical and horizontal) spatial frequencies or wave numbers.

An amplitude response of an offset filter is determined from the first and second magnitude responses. An offset filter is an imaginary linear, time-invariant system that provides the second camera image (which was recorded with offset) at the output or approximates it when the first camera image (which was recorded without offset) is presented at the input. The amplitude response indicates the magnitude response of the transfer function of such an offset filter.

For the at least one third or further camera image, the Fourier transform is determined in each case and multiplied in each case by the amplitude response of the offset filter. From this, i.e. from the product of the Fourier transform of the at least one third or further camera image and the amplitude response, a Moiré-corrected result image is determined in each case by inverse Fourier transformation (Fourier inverse transformation).

By applying the amplitude response determined from the first and second camera images, which approximates the effect of offset motion on the second camera image (constraining it to a linear, time-invariant system), suppression of Moiré interference is possible for the third or further camera image in a manner similar to that for the second camera image. An advantage of this embodiment is that the camera (relative to the display device) does not need to be moved when capturing the third or further camera image.

This makes Moiré correction possible even for camera images with very short exposure times (for example, when capturing very bright display devices). In addition, mechanical stress to which the camera and/or the display device may be subjected during movement along the offset path can be avoided.

In a further embodiment of this embodiment, the first and second camera images are captured from a first display device and the third or further camera image is captured from a second or further display device which is or are of identical construction to the first display device and is or are arranged relative to the camera in an identical or similar recording arrangement.

A similar recording arrangement in this context means the placement of a second or further identical display device within the same surveying setup with geometric deviations as they are usual for the placement of measuring objects and/or measuring devices within the scope of a production or quality control of such display devices.

The application of an amplitude response derived based on a first display device to at least one further constructively identical display device within the same surveying setup has the advantage that for the application of the Moiré correction only one camera image with no or slight movement has to be taken in each case, which further reduces both the mechanical loads and the required measuring time. In particular, this allows a surveying setup to be configured once based on a first display device and then applied unchanged to a variety of display devices, for example in a continuous process of production and quality control.

In an embodiment, the amplitude response of an offset filter is determined as the quotient of the second magnitude response (which was determined from the Fourier transform of the second camera image) with respect to the first magnitude response (which was determined from the Fourier transform of the first camera image). In this way, the amplitude response of an offset filter can be determined in a particularly easy way.

In a further embodiment, an offset filter can be formed by subjecting the quotient of the second to the first magnitude response to a nonlinear transformation, for example a binarization.

In such an embodiment, the amplitude response of an offset filter is binarized by assigning, by means of a local segmentation algorithm based on the quotient of the second magnitude response (determined from the Fourier transform of the second camera image) with respect to the first magnitude response (determined from the Fourier transform of the first camera image), the value 0 to each pair of a vertical and a horizontal spatial frequency, if the quotient of the magnitude curves lies below a predetermined threshold value; or the value 1 is assigned if the quotient of the magnitude curves lies above this predetermined threshold value or is equal to this predetermined threshold value.

In this way, a particularly robust offset filter can be determined. Furthermore, the robustness of such amplitude responses expressed as binary filters can be further increased by the application of further image operations such as morphological operators.

Such an offset filter can also be determined by the fact that—while maintaining the other process steps already described—instead of moving the camera during the recording of the second camera image (which is recorded from the first display device), only the sensor with the sensor pixels arranged in a matrix-like manner is moved relative to the display device, while the camera is at rest relative to the recorded display device. In other words, within the camera, for example by means of a piezo actuator, the sensor is moved relative to the camera housing during the recording of the second camera image. This can reduce the mechanical stress on the camera. Since cameras are available in which suitable actuator technology for moving the sensor is already integrated, this can also reduce the device-related effort for determining an offset filter.

In an embodiment of the method, in a teach-in step prior to the recording of the at least one camera image for obtaining the Moiré-corrected result image, at least one preferred offset path matching a display device and a camera is determined such that a Moiré interference measure is below a predetermined Moiré threshold value and/or is minimized.

The determination of the at least one preferred offset path can be performed by selecting its parameters as parameters of a discrete optimization problem, wherein the Moiré interference measure is selected as the optimization criterion to be minimized, for which a statistical estimate is determined based on a sample of Moiré-corrected result images.

In each case, the Moiré-corrected result images on which this estimate is based are formed from camera images using the method according to the invention. In other words, the Moiré interference measure is determined in the teach-in step as a quality criterion for each examined offset path.

The procedure can be aborted if at least one preferred offset path is found for which the quality criterion (the assigned Moiré interference measure) falls below the predetermined Moiré threshold. Alternatively, the method is terminated if no or no sufficient improvement of the quality criterion could be achieved in a predetermined number of optimization steps. Methods for solving such discrete optimization problems are known from the prior art.

For example, a preferred offset path may be determined by varying a plurality of linear (straight) movements of the camera relative to the display device by direction and length (offset).

Similarly, a preferred offset path may be determined as a polygonal path from a plurality of linear (straight) motions, each varied by direction and length (offset).

It is also possible to determine a plurality of preferred offset paths by executing randomly selected offset paths in the teach-in step and examining their effect on the Moiré interference measure, whereby their length (offset) varies randomly but is selected to be smaller than an offset amplitude. In this way, an offset amplitude, i.e.: a maximum length of the offset path, can be determined for which a particularly good reduction of the Moiré interference measure takes place.

Using discrete optimization methods known to those skilled in the art, it is possible to determine parameters that lead to a sufficiently good or optimal reduction of the Moiré interference measure. These parameters may describe a single preferred offset path. They may also specify properties, such as a length (an offset), a length range (an offset interval), or a direction, with which a plurality of preferred offset paths is described.

For example, in the teach-in step, a single preferred offset path can be determined by length (offset) and course, which is traversed unchanged during the recording of the at least one camera image.

Further, offset paths can be randomly selected in the spatial course and scaled to a length (offset) which has been determined to be preferred.

An advantage of the embodiment with a teach-in step is that an optimal or sufficiently good Moiré suppression can be achieved for the selected arrangement of display device and camera.

After the teach-in step, the camera is moved during the recording of camera images in such a way that in each case the camera image is moved relative to the display image along the preferred offset path determined in the teach-in step. It is also possible that the preferred offset path is varied stochastically by imposing random deviations from the preferred offset path on the camera motion.

Depending on the arrangement of the display pixels, differently oriented offset paths may result in different degrees of Moiré interference suppression. For example, for a display device with rectangular display pixels arranged abutting each other in the horizontal (x-) direction but spaced apart in the vertical (y-) direction, it may be advantageous to select an offset path with predominantly vertical orientation.

Thus, this embodiment allows the selection of an offset path tailored for a particular display device for particularly good suppression of Moiré interference.

In an embodiment of the method, a teach-in step determines an offset amplitude suitable for a display device and a camera in such a way that a Moiré interference measure is below a predetermined Moiré threshold value and/or is minimized if the camera is moved during the recording of at least one camera image by an offset path with an offset that is smaller than or equal to the offset amplitude. During the recording of the at least one camera image, an offset path is traversed which is randomly selected with regard to direction, course and offset length, but the offset length is selected to be smaller than or at most equal to the offset amplitude determined in the teach-in step.

In an embodiment, a preferred offset is determined in a teach-in step such that a Moiré interference measure is minimized when the camera is offset along an offset path by the preferred offset relative to the start position during recording of the at least one camera image. In addition, an offset interval having a predetermined interval width is determined that includes, preferably symmetrically includes, the preferred offset. A discrete optimization method can be used to minimize the Moiré interference measure, as described above.

After the teach-in step, the camera is moved during the recording of camera images such that in each case the camera image is shifted relative to the display image along an offset path having a length (an offset) within the offset interval determined in the teach-in step.

In this embodiment it is sufficient if the optimal or preferred length of an offset path is adjusted to the combination of the display device and the camera in the teach-in step as a single parameter.

It has been found that offset paths of the camera relative to the display device, with which a particularly good result in Moiré correction can be achieved, depend essentially on the pixel pitch of the display device and further also on the pixel pitch of the sensor pixels and the image scale. Therefore, with this embodiment of the teach-in step, a particularly efficient Moiré reduction adapted to the respective arrangement of the camera and display device is possible.

The determination of an offset path or an offset interval or a preferred offset in a teach-in step can also be performed in each case with reference to a section of the camera image, i.e.: to a contiguous area of sensor pixels.

For example, in the case of curved display devices, due to distortions of the camera lens or due to perspective distortion, it is possible that different offset paths, different offset intervals or different preferred offsets prove to be particularly suitable for Moiré correction for different areas of a camera image.

With this embodiment of the method, an associated parameter of the camera movement (offset path, offset interval or preferred offset) is determined in each case by discrete optimization in the teach-in step for different camera image areas completely covering a camera image as a whole. Subsequently, at least one camera image is recorded for each camera image area, whereby the camera is moved according to the respective assigned parameter. The majority of the camera images taken in this way are aligned by means of an image registration process and then summed or averaged pixel by pixel to form a Moiré-corrected result image.

In this way, a good Moiré-corrected result image can be obtained even if, due to the geometric or optical arrangement of a display device, a movement of the camera has a different effect on the imaging of the display image on the camera image in different image areas.

In an embodiment, a coefficient of variation of the sensor pixel values taken from at least one area of a camera image is formed as the Moiré interference measure. The coefficient of variation, i.e.: the scatter related to the expected value, can be determined particularly easily and quickly and represents a good approximation of the influence of Moiré interference.

In an embodiment of the method, an offset path is determined stochastically. The offset path can be determined stochastically with regard to its length, i.e.: the traveled offset, by determining this length as a random variable uniformly distributed in a length interval (the offset interval). An offset path, which can be predetermined or randomly determined with regard to its spatial path, is scaled according to the length determined in this way.

In this way, a particularly good suppression of Moiré interference is achieved for a plurality of offset movements performed independently according to this uniform distribution.

An offset path can also be determined stochastically by stochastically imposing deviations on a preferred offset path, for example an offset path determined in a teach-in step.

In an embodiment of the invention, the movement of the camera relative to the display device is along the direction of a column and/or a row of the matrix of display pixels. In other words, the movement of the camera is parallel to the display device for a planar display device. For a curved display device, the movement of the camera is coplanar to a tangential plane, preferably to a tangential plane passing through a display pixel located at or near the center of the matrix of display pixels. With such offset movements lying in a two-dimensional plane, particularly good suppression of Moiré interference can be achieved.

It is also possible to select a plurality of different tangential planes for a curved display device. Then, for each of the tangential planes, a respective parallel movement of the camera is executed during the recording of at least one camera image and the individual camera images are aligned by means of an image registration process and then summed or averaged pixel by pixel to form a Moiré-corrected result image. This enables a particularly accurate Moiré correction.

In an embodiment of the method, the camera is moved along its optical axis relative to the display device. This causes a defocusing, i.e.: a convolution with a concentric PSF sloping towards the edge.

This embodiment has the advantage that a displacement only has to be made along one direction of movement. Such a method is easier to implement than a displacement along several directions.

In an embodiment of the method, the camera is moved about the start position along an offset path that comprises symmetrical sub-paths about the start position, that is: sub-paths equal in magnitude and direction but opposite in direction. For example, the offset path can be mirror-symmetrical:

$$x(t) = x_0 + \delta_x(t), 0 \le t < \frac{T}{2}$$
$$y(t) = y_o + \delta_y(t), 0 \le t < \frac{T}{2}$$
$$x\left(t + \frac{T}{2}\right) = x_0 - \delta_x(t), 0 \le t < \frac{T}{2}$$
$$y\left(t + \frac{T}{2}\right) = y_o - \delta_y(t), 0 \le t < \frac{T}{2}.$$

This ensures that the Moiré-corrected result image can be referenced to the start position with particularly small deviations.

In an embodiment of the method, a color channel-related result image is determined for a plurality of color channels in each case by arranging a color filter between the display device and the sensor of the camera, wherein a color channel-related offset interval is determined for each color channel and wherein the color channel-related result images are registered against one another.

Such color filters can have different thicknesses and different refractive indices and are arranged approximately perpendicular to the optical axis of the camera lens between the display device and the sensor surface. They can therefore, for example for a collimated beam path, cause a parallel shift that varies in magnitude depending on the color filter.

They can also, for example for a divergent beam path, lead to distortion that varies depending on the location (in the sensor area).

With the proposed embodiment, Moiré-corrected color images can be obtained by superimposing the registered color channel-related result images. This additionally allows a spectral or at least color channel related examination of display devices.

In a method for evaluating the display quality of a pixel-based display device, a Moiré-corrected result image is obtained according to one of the methods described above from at least one camera image recorded with a camera, and the display quality of the display device is determined on the basis of this Moiré-corrected result image.

An advantage of this method is that the quality assessment for the display device is not affected or distorted by Moiré interference. This allows an evaluation that reflects the actual quality of the display device. In addition, an unbiased evaluation with a particularly high spatial resolution, preferably with a spatial resolution accurate to a single display pixel, is possible by eliminating aliasing artifacts with high spatial frequencies (close to the Nyquist frequency). As a result, even locally small defects or disturbances on a display device can be detected and evaluated. In particular, however, this avoids false positive detection of pixel defects. Thus, a particularly reliable evaluation of display devices is possible.

In an embodiment of this method, defective display pixels of the display device are detected and/or localized. This enables a particularly simple quality control of display devices.

In an embodiment, the uniformity of the brightness distribution across the display device is determined. An advantage of the invention is that aliasing artifacts with low spatial frequencies that simulate errors or disturbances of the uniformity of the brightness distribution are eliminated.

In particular, the evaluation method according to the invention allows for methods known as DeMURA for correcting brightness differences that may occur due to manufacturing technology and/or aging in the case of pixel-related differences in operating time or intensity statistics between display pixels.

Preferably, brightness differences are evaluated and/or parameters for correcting such brightness differences are determined on the basis of display images that have a low brightness or luminance.

In an embodiment of the method, the local distribution of a photometric parameter, preferably the luminance, across the display device is determined to evaluate the display quality. This enables a particularly accurate and objectively reproducible evaluation of the display device.

A device for carrying out one of the aforementioned methods comprises a camera, a positioning unit, a control unit and an evaluation unit. The positioning unit can be designed to be stationary with respect to a display device and can be set up to move the camera. The positioning unit may also be stationary with respect to the camera and arranged to move a display device.

The positioning unit is arranged for motorized movement of the camera or alternatively of the display device by an offset lying within the offset interval. The control unit is arranged for triggering the recording of a camera image with the camera.

The evaluation unit is arranged to form a Moiré-corrected result image using one of the methods described above.

The advantages of this device result from the advantages of the methods described above.

The positioning unit may be arranged for stochastic or quasi-stochastic movement of the camera independently of the recording of a camera image.

In an embodiment of the invention, however, it is also possible for the control unit to be set up to control the positioning unit and to trigger the recording of a camera image in accordance therewith, i.e.: in accordance with the movement of the camera by means of the positioning unit. As a result, offset paths can be reproduced and their filter effect for suppressing Moiré interference can be set more precisely.

In an embodiment of the device, the control unit and the evaluation unit are combined in one control and evaluation unit. This enables a particularly compact design and the use of low-cost, flexible components. For example, a control and evaluation unit can be designed as a PC (personal computer) or notebook.

In an embodiment, the positioning unit is designed as a goniometer that is set up to rotate the camera about preferably two mutually orthogonal axes of rotation. Goniometers are positioning units commonly used for luminance measurement and are readily available in this field of application, enabling a particularly cost-effective setup.

Preferably, the goniometer is set up for precise rotation of the camera or the display device through very small angles, preferably through angles of less than one degree, especially preferably through angles of less than one arc minute. For such very small angles of rotation, given a sufficiently large distance between the display device and the camera, rotation by means of the goniometer achieves an approximately coplanar offset of the display image relative to the camera image.

However, the positioning unit can also be designed as any other motion unit that can be linearly displaced by motor along at least one, preferably along at least two mutually orthogonal directions of motion.

As an example, the positioning unit can also be designed as an industrial robot. This enables particularly flexible movement of the display device or the camera.

The positioning unit can also be designed as a cross table (XY table) that can be moved along two axes. Traversing along the axes can be performed by means of electrically operated rotary and/or linear drives. For example, rotary motors with spindle drive can be used for traversing. It is also possible to use piezoelectric linear drives.

In an embodiment of the device, the positioning unit is designed as at least one vibration unit, which is arranged on a housing of the camera and can be set in vibration. By means of the vibration unit, the camera is set into vibration during the recording of a camera image. The vibration of the camera appears as an offset path of the camera image with respect to the display image.

It is possible that several vibration units are arranged on the camera, for example one vibration unit each in the horizontal x-direction (row direction of the sensor pixels), in the vertical y-direction (column direction of the sensor pixels), and one vibration unit in the direction of the optical axis of the camera. This allows an offset path to be designed in a particularly flexible manner.

Such a vibration unit can, for example, be designed as a piezo actuator or as a loudspeaker or as a vibration motor and be arranged on the camera housing.

In an embodiment with a loudspeaker, the at least one loudspeaker can be driven with a harmonic drive signal. For such an embodiment, a teach-in step may comprise, for example, determining a frequency and/or an amplitude of the drive signal such that the Moiré interference level is particularly well reduced.

In an embodiment, the camera is designed as a luminance measurement camera and is set up to record the spatial distribution of a photometric parameter, preferably a luminance emitted by a display device. This enables a particularly accurate and objectively reproducible evaluation of the display device.

BRIEF DECRIPTION OF THE DRAWINGS

Exemplary embodiments of the invention are explained in more detail below with reference to drawings.

Figure 2A:
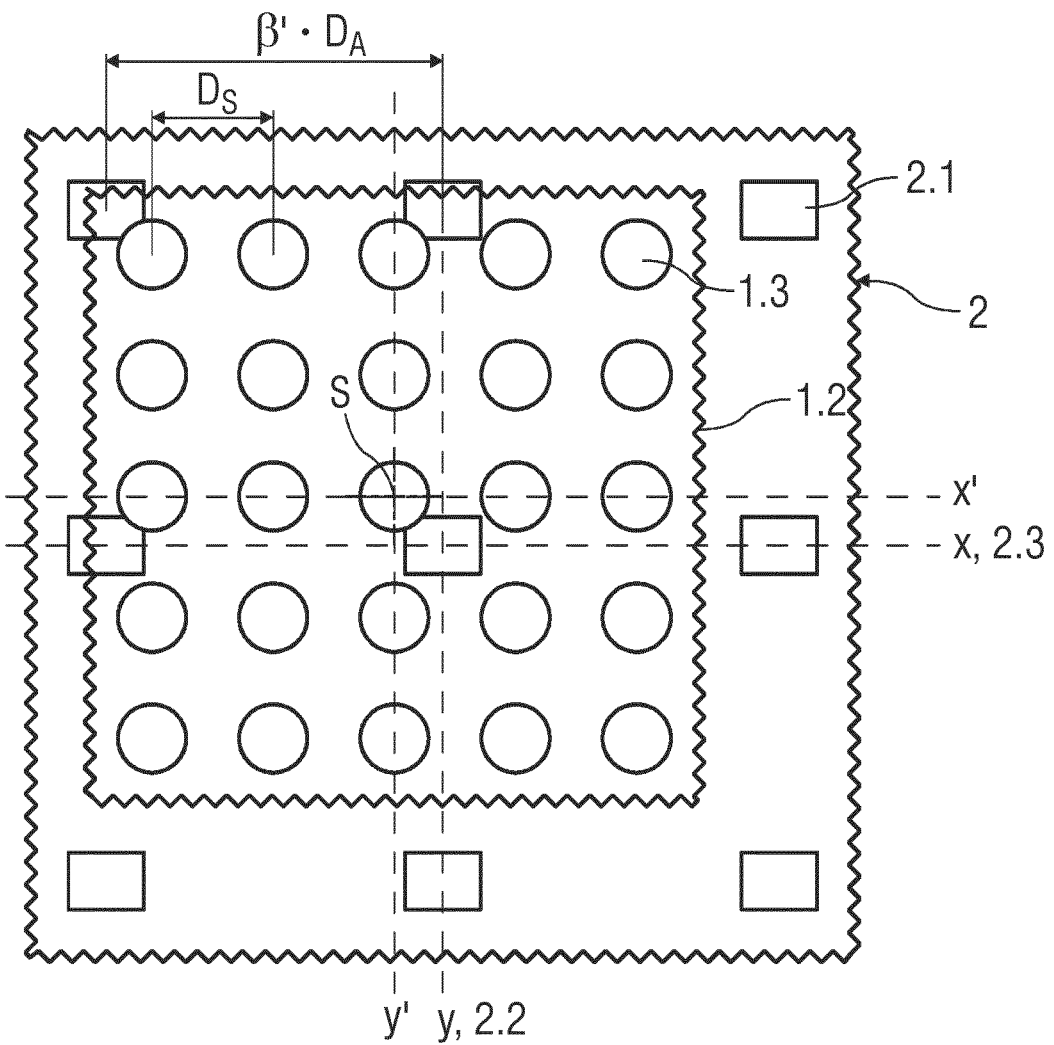
Figure 2B:
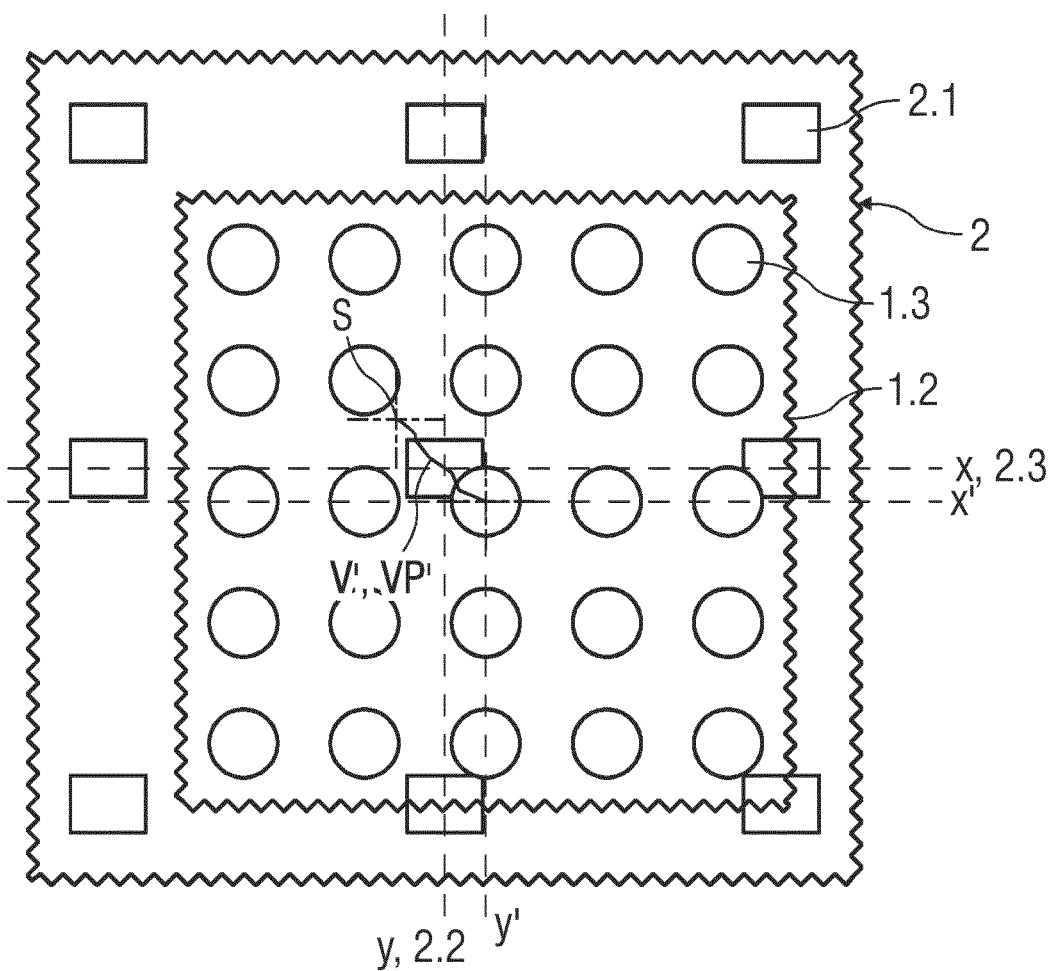
Figure 3A:
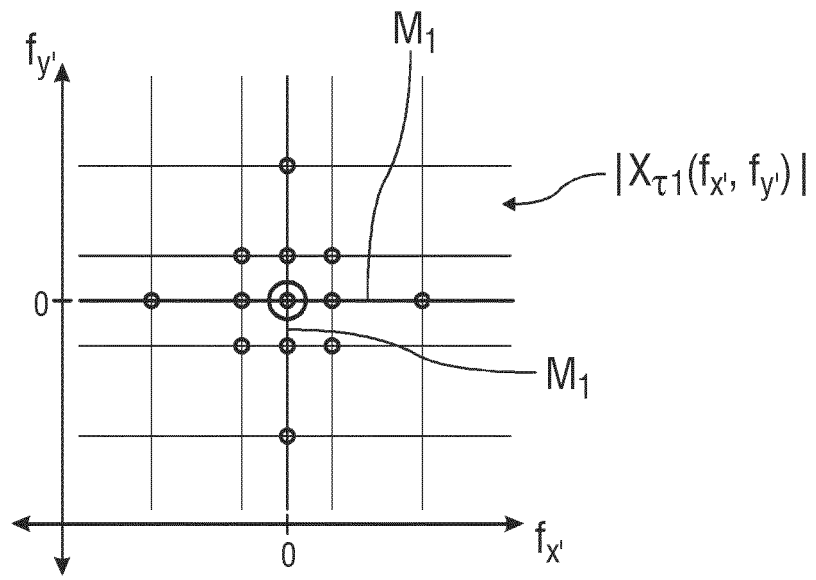
Figure 3B:
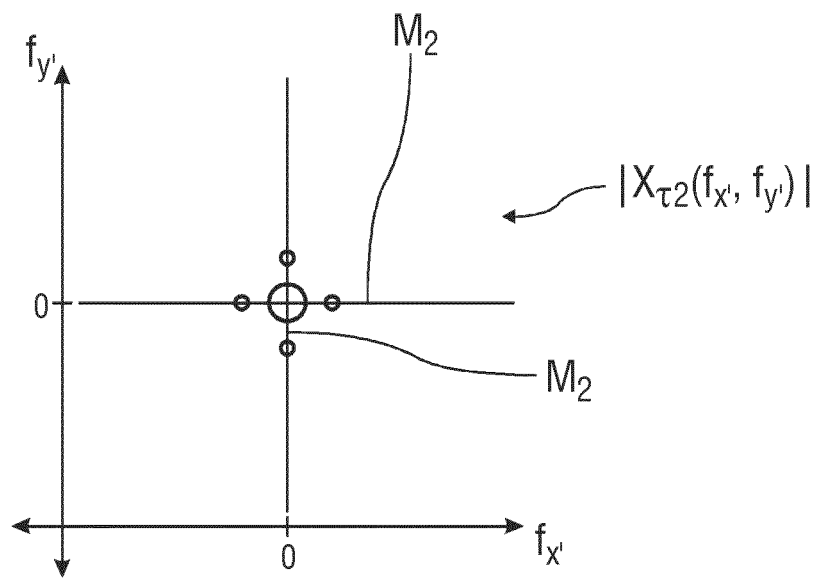
Figure 4:
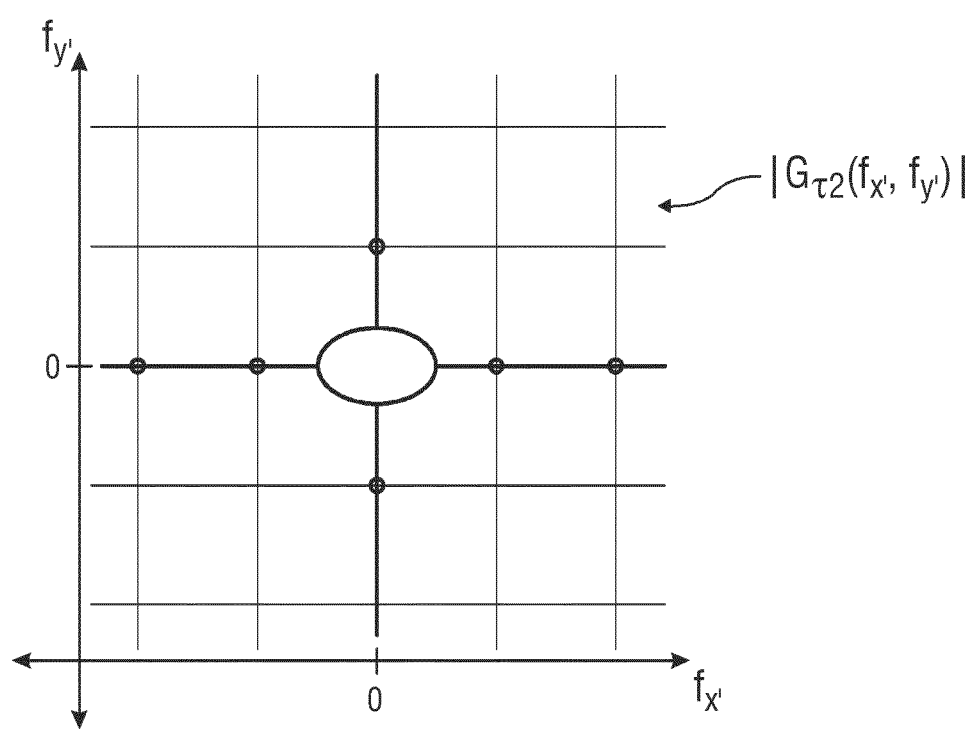

FIG. 1 schematically shows an arrangement for taking display images of a display device, FIGS. 2A and 2B schematically show arrangements of sensor pixels and display pixels, FIGS. 3A and 3B schematically show the magnitude of Fourier transforms of a first and a second camera image and FIG. 4 schematically shows the magnitude response of an amplitude response of an offset filter.

Corresponding parts are provided with the same reference signs in all figures.

DETAILED DESCRIPTION OF SPECIFIC EMBODIMENTS

FIG. 1 schematically shows an arrangement for recording a display image displayed by a display device 2 by means of a camera 1. The display device 2 comprises a plurality of display pixels 2.1 arranged in a matrix-like manner along rows 2.3 and columns 2.2. The rows 2.3 run approximately parallel to a horizontal x-direction. The columns 2.2 run approximately parallel to a vertical y-direction.

The camera 1 comprises sensor pixels 1.3 arranged in a matrix-like manner in a sensor surface 1.2. A camera lens 1.1 is arranged in front of the sensor surface 1.2, which is arranged to image the display image represented by the display pixels 2.1 onto the sensor surface 1.2. The optical axis O of the camera 1 is directed approximately perpendicularly and centrally to the surface drawn by the display pixels 2.1.

The camera 1 is arranged in its entirety (comprising the camera lens 1.1 and the sensor surface 1.2 with the sensor pixels 1.3) on a holding plate 3.2 of a positioning unit 3, for example clamped or screwed. The positioning unit 3 is set up for motorized movement of the holding plate 3.2 along the horizontal x-direction and along the vertical y-direction by means of motors 3.1. Instead of motors, other movement elements, for example piezo-electric actuators, can also be used for the linear movement along the x and y directions.

By means of the positioning unit 3, the camera 1 can be moved by an offset V relative to the display device 2 along an offset path VP. The offset V denotes the length of the offset path VP.

The motors 3.1 and the image recording by the camera 1 are controlled by a control unit 4 connected thereto in such a way that during the recording of a camera image formed by the sensor values read out from the sensor pixels 1.3, the camera 1 is offset in the x-direction and/or in the y-direction relative to the display device 2.

It is also possible that a plurality of camera images is captured while the camera 1 is offset with respect to the display device 2.

The camera images are read out by the camera 1 in an evaluation unit 5. If a plurality of camera images is recorded while the camera 1 is moving, the individual camera images are superimposed, for example added or averaged, by the evaluation unit 5 to form a Moiré-corrected result image.

FIGS. 2A and 2B schematically show the change in position of the display pixels 2.1 with respect to the sensor pixels 1.3 when the camera 1 is moved with respect to the display device 2. For better clarification, only a part of the matrix-like arranged display pixels 2.1 and a part of the matrix-like arranged sensor pixels 1.3 are shown in each case.

The sensor pixels 1.3 are spaced apart by a sensor pixel pitch $D_S$. For simplified representation, the sensor pixel pitch $D_S$ is selected to be the same in the vertical y' direction as in the horizontal x' direction; but different distances are also possible vertically and horizontally.

In an analogous manner, the display pixels 2.1 are spaced with a display pixel pitch $D_A$. In the event that the reproduction scale β' achieved by the camera lens 1.1 deviates from 1, the display pixels 2.1 appear at a distance increased or decreased by this reproduction scale compared to the sensor pixel pitch $D_S$. In particular, the resulting reproduction scale (RPS) determines which spatial frequencies appear erroneous in the camera image due to aliasing (Moiré).

FIG. 2A shows the position of the sensor pixels 1.3 in a start position S. FIG. 2B shows the position of the sensor pixels 1.3 after a movement of the camera 1 along an offset path VP during an exposure. The offset path VP has a length which is referred to as offset V.

In the projection onto the sensor surface 1.2, the offset path VP appears as an offset path image VP with a length that is referred to as image offset V' in the following, taking into account the image-side imaging scale β'.

The luminance imaged by one or more display pixel 2.1 onto a sensor pixel 1.3 (the image of the display image on the sensor surface) is convolved only with the pixel aperture (the point spread function PSF) of the respective sensor pixel 1.3 when the camera 1 is not moving.

In the spatial frequency domain this means the multiplication of the spectrum of the imaged display image of the display device 2 (that is: the matrix of the display pixels 2) with the spectrum of the PSF (the module transfer function MTF). The matrix of all sensor pixels 1.3 means a sampling, in the frequency domain a multiplication of the resulting spectrum. In the process, higher frequency components can get into the base spectrum, which leads to aliasing.

By moving the camera 1, the luminance (the image of the display image on the sensor) imaged by one or more display pixel 2.1 onto a sensor pixel 1.3 is convolved with the pixel aperture (point spread function PSF) of the respective sensor pixel 1.3 and additionally with a filter kernel h(x', y') determined by the offset path image VP'. The position curve of the offset path image VP is, starting from the start position S with the coordinates $x'_o, y'_o$, determined by the movement $\delta_{x'}(t), \delta_{y'}(t)$ in (horizontal) x'-direction and in vertical y'-direction, respectively. The filter kernel h(x', y') assumes a value at the locations determined by the totality of the values $\{\delta_{x'}(t), \delta_{y'}(t)\}$ which value is inversely proportional to the motion velocity vv(t) of the display image with respect to the camera image at these locations and which is in particular different from 0. At all other locations (x', y')∉{$\delta_{x'}(t)$, $\delta_{y'}(t)$} applies h(x', y')=0.

In the spatial frequency range, this thus means the multiplication of the spectrum of the display image (matrix of display pixels 2.1) with the spectrum of the PSF (MTF) and the spectrum of the offset path image VP'.

Therefore, by moving the camera 1, the PSF of the sensor pixels 1.3 is convolved with the offset path image VP', which leads to a multiplication of the spectrum with the Fourier transform of the offset path image VP' in the spatial frequency range, that is: to a filtering. Thus, the choice of the offset path image VP', which is determined by the offset path VP, offers the possibility of suppressing or reducing interfering frequency components.

Thus, the offset path VP can be used to determine a filter kernel h(x', y') for a location-continuous filtering, in particular for a smoothing, which removes or suppresses Moiré interference in the camera image. With the proposed teach-in method, an offset path VP can be determined by discrete optimization in such a way that the best possible reduction of Moiré interference is achieved for the combination of the camera 1 with the display device 2.

The advantage over discrete-location filtering of the camera image is that Moiré interference can be selectively removed or reduced at, in principle, arbitrary spatial frequencies. In particular, spatial frequencies that are not an integer multiple of the reciprocal of the sensor pixel pitch $$f_o = \frac{1}{D_S}$$

and that are therefore not accessible to a spatially discrete filtering of the discretized camera image can also be attenuated or eliminated by a spatially continuous filtering with the filter kernel h(x', y'). Thus, a suppression of Moiré interference is possible while maintaining a high spatial resolution.

An embodiment relating to a further development of the invention is explained below with reference to FIGS. 3A, 3B and 4.

FIG. 3A schematically shows a first magnitude plot $|X_{\tau 1}(f_{x'}, f_{y'})|$ over a horizontal and a vertical spatial frequency $f_{x'}$, $f_{y'}$. The first magnitude plot $|X_{\tau 1}(f_{x'}, f_{y'})|$ is the magnitude of the Fourier transform $|X_{\tau 1}(f_{x'}, f_{y'})|$ of a first camera image exposed over a first exposure time τ1.

The exposure of the first camera image is carried out in such a way that the camera 1 is not moved or is moved only slightly relative to the display device 2 during the first exposure time τ1. "Slightly moved" shall be understood here and in the following as a movement that causes an offset V that is smaller than the display pixel pitch $D_A$, preferably smaller than $D_A/3$. In other words, the offset path VP caused by the movement of the camera 1 relative to the display device 2 has an offset V parallel to the sensor surface 1.2 that is smaller than the display pixel pitch $D_A$, preferably smaller than $D_A/3$.

The first camera image can be captured by selecting the first exposure time τ1 to be very short relative to the speed of movement of the camera 1 (that is: selected such that the offset path image VP' is very short). Thereby, a shortening of the first exposure time τ1 can be compensated by increasing the brightness of the display pixels 2.1 inversely proportional to the change of the first exposure time τ1.

Additionally or alternatively, the recording of the first camera image can occur by reducing or stopping the movement of the camera 1 during the first exposure time τ1.

Due to the comparatively very short or completely suppressed image offset V', the filter effect of the filter kernel h(x', y') determined by the offset path image VP', explained with reference to FIGS. 2A and 2B, is reduced. In the extreme case, when the camera 1 is completely at rest with respect to the display device 2, the filter kernel h(x', y') degenerates into a Dirac pulse and causes no change in the first camera image recorded by the sensor pixels 1.3.

Accordingly, the Fourier transform $X_{\tau 1}(f_{x'}, f_{y'})$ shows aliasing (i.e.: Moiré-interference). In FIG. 3A, light gray values indicate high magnitude amplitudes of the Fourier transform $X_{\tau 1}(f_{x'}, f_{y'})$, while dark gray values indicate low magnitude amplitudes. The horizontal dimension in FIG. 3A corresponds to the horizontal spatial frequency $f_{x'}$, which is associated with the horizontal x'-direction of the sensor surface 1.2. The vertical dimension in FIG. 3A corresponds to the vertical spatial frequency $f_{y'}$, which is assigned to the vertical y'-direction of the sensor surface 1.2.

The aliasing (Moiré) in the first camera image causes prominent, bright (white) first perturbations M in the Fourier transform $X_{\tau 1}(f_{x'}, f_{y'})$ in the manner of vertical and horizontal lines corresponding to high magnitude amplitudes at certain horizontal and vertical spatial frequencies.

FIG. 3B shows, in a manner analogous to FIG. 3A, a second magnitude plot $|X_{\tau 2}(f_{x'}, f_{y'})|$ of the Fourier transform of a second camera image exposed over a second exposure time τ2 and in which the same display image, represented by the same display device 2 has been captured as in the first camera image.

In contrast to the first camera image, the exposure of the second camera image is performed in such a way that an offset path image VP is generated with an offset V parallel to the sensor surface 1.2 by moving the camera 1 relative to during the second exposure time τ2, which offset V is between one and five times the display pixel pitch $D_A$. In other words, the second camera image is recorded as already explained with reference to FIGS. 2A and 2B.

Also in the Fourier transform of the second camera image, aliasing (Moiré) appears as second disturbance $M_2$. However, the already explained filter effect of the filter kernel h(x', y') determined by the offset path image VP causes a significant reduction of this second interference $M_2$ compared to the first interference $M_1$ in the Fourier transform of the first camera image.

The suppression of the aliasing (Moiré) achieved at the second camera image with the offset V of the camera 1 with respect to the display device 2 during the second exposure time τ2 can be described in terms of systems theory as transfer function of an offset filter, which results from the quotient of the Fourier transform of the second camera image $X_{\tau 2}(f_{x'}, f_{y'})$ (with Moiré—suppressing offset V) related to the Fourier transform of the first camera image $X_{\tau 1}(f_{x'}, f_{y'})$ (without Moiré—suppressing offset V) results.

In particular, the frequency-selective suppression by the offset V during the recording of the second camera image can be described as the amplitude response $|G_{\tau 2}(f_{x'}, f_{y'})|$ of such an offset filter.

For example, the amplitude response $|G_{\tau 2}(f_{x'}, f_{y'})|$ can be determined from the magnitude ratio of the second to the first magnitude response:

$$|G_{\tau 2}(f_{x'}, f_{y'})| = \frac{|X_{\tau 2}(f_{x'}, f_{y'})|}{|X_{\tau 1}(f_{x'}, f_{y'})|}$$

Alternatively, the determination of the amplitude response $|G_{\tau 2}(f_{x'}, f_{y'})|$ can also be based on a local segmentation which, in the manner of an image processing operation, assigns a binary value $|\tilde{G}_{\tau 2}(f_{x'}, f_{y'})| \in \{0, 1\}$ to each magnitude value of the amplitude response $|G_{\tau 2}(f_{x'}, f_{y'})|$ in a threshold-dependent manner.

For example, this image processing operation can be applied to the magnitude ratio of the second to the first magnitude response. This transforms the amplitude response $|G_{\tau 2}(f_{x'}, f_{y'})|$ into a binary amplitude response $|\tilde{G}_{\tau 2}(f_{x'}, f_{y'})|$. In general, other operations or additional operations, such as logical operations or morphological operations from the field of image processing, can be used to derive an amplitude response $|G_{\tau 2}(f_{x'}, f_{y'})|$ from $|X_{\tau 1}(f_{x'}, f_{y'})|$ and $|X_{\tau 2}(f_{x'}, f_{y'})|$. For example, it is possible to binarize the first and second magnitude response $|X_{\tau 1}(f_{x'}, f_{y'})|$, $|X_{\tau 2}(f_{x'}, f_{y'})|$ before forming the quotient in the same or similar way as the amplitude response $|G_{\tau 2}(f_{x'}, f_{y'})|$ and then to derive an amplitude response $|G_{\tau 2}(f_{x'}, f_{y'})|$ by means of logical operators like an exclusive-or-operation (XOR).

In general, the goal in defining an offset filter is to determine an amplitude response $|G_{\tau 2}(f_{x'}, f_{y'})|$ such that in it pairs of horizontal and vertical spatial frequencies $(f_{x'}, f_{y'})$ are assigned a low magnitude or zero, if a high amplitude is determined there in the first (unadjusted) magnitude profile $|X_{\tau 1}(f_{x'}, f_{y'})|$ and a comparatively very low amplitude is determined in the second (adjusted) magnitude profile $|X_{\tau 1}(f_{x'}, f_{y'})|$.

FIG. 4 schematically shows the amplitude response $|G_{\tau 2}(f_{x'}, f_{y'})|$ of an offset filter V, which is determined from the first and the second magnitude response $|X_{\tau 1}(f_{x'}, f_{y'})|$, $|X_{\tau 2}(f_{x'}, f_{y'})|$. The amplitude response $|G_{\tau 2}(f_{x'}, f_{y'})|$ specifies the degree of attenuation (or amplification) to which a camera image is subjected in a frequency-selective manner for a parameter combination of a horizontal and a vertical spatial frequency.

The application of a binary amplitude response $|\tilde{G}_{\tau 2}(f_x, f_y)|$ has the advantage over an offset filter with continuous amplitude response $|G_{\tau 2}(f_x, f_y)|$ that (residual) Moiré present in $|X_{\tau 2}(f_x, f_y)|$ can also be suppressed, as long as it is only significantly weaker than in $|X_{\tau 1}(f_x, f_y)|$, since all frequency components significantly different between $|X_{\tau 1}(f_x, f_y)|$, and $|X_{\tau 2}(f_x, f_y)|$ are completely suppressed. Moreover, simple additional morphological operations on the binary amplitude response $|\tilde{G}_{\tau 2}(f_x, f_y)|$, such as dilation, can further increase the robustness of the method.

By using an offset filter, it is possible to perform Moiré suppression even in a camera image that was taken with no or only insignificant offset V during exposure. For this purpose, this camera image is subjected to a Fourier transformation. The Fourier transform of the camera image $(X(f_x, f_y))$ is frequency-selectively multiplied by the amplitude response $|G_{\tau 2}(f_x, f_y)|$ of the offset filter determined from the first and the second camera image as explained above:

$$X'(f_x, f_y) = X(f_x, f_y) \cdot |G_{\tau 2}(f_x, f_y)|$$

The spatial frequency weighted Fourier transform obtained in this way $X'(f_x, f_y)$ is particularly attenuated at spatial frequencies $f_x, f_y$ at which strong first perturbations $M_1$ are present in the first camera image but no or only small perturbations $M_2$ are present in the second camera image, because for these spatial frequencies the amplitude response $|G_{\tau 2}(f_x, f_y)|$ of the offset filter becomes nearly zero or zero. According to the invention, the spatial frequency weighted Fourier transform $X'(f_x, f_y)$ is then subjected to an inverse Fourier transform (Fourier inverse transform), as a result of which a Moiré-corrected result image is obtained.

In other words: If the geometrical (with respect to the arrangement of camera 1 and display device 2) and the essential lighting conditions are not or only slightly changed compared to the recording of the first and the second camera image, then by applying the amplitude response $|G_{\tau 2}(f_x, f_y)|$ to the Fourier transform of a camera image and a subsequent inverse Fourier transform (Fourier inverse transform), the same or similar suppression of aliasing (Moiré) interference can be achieved as by moving the camera 1 relative to the display device 2 along the same offset path VP as was selected when the second camera image was recorded.

This makes it possible to achieve the same or similar suppression of disturbances $M_1$, $M_2$ even if the camera 1 is not moved or is moved only slightly during the recording of the camera image. In particular, this makes it possible to avoid a mechanical load on the camera 1 and/or the display device 2, such as is generated by vibration-like offset movements.

Furthermore, it is thereby also possible to suppress disturbances in camera images which are recorded with a very short exposure time and in which, as a result, no offset movement is possible which would be required for sufficient disturbance suppression. In addition, it is possible to suppress disturbances in further camera images which were recorded in a similar recording situation, for example camera images from a different but identically constructed display device.

The third and a plurality of other camera images may be taken from different display devices 2 than the first and second camera images. For example, display devices 2 that are continuously manufactured identically in a production process can be arranged within the framework of usual tolerances for quality control to be in the same position relative to the camera 1 as a first display device 2 from which the first and second camera images were taken.

The third and further camera images are then recorded by these continuously exchanged display devices 2. Moiré interference in the third and further camera images is removed or attenuated by application of the offset filter determined from the first and second camera images for a different but identically constructed first display device 2.

In order to obtain greater robustness against the minor geometric changes in the recording situation between identical display devices 2 that are to be expected in practice, a binary amplitude response $|\tilde{G}_{\tau 2}(f_x, f_y)|$ determined as described above can, for example, be processed by means of morphological operations such as dilatation. This also suppresses spatial frequencies that are in the immediate vicinity of the spatial frequencies originally detected as Moiré interference. Thus, in addition, even minor shifts of the aliasing frequencies caused by the slightly changed recording situation, for example an axial rotation around the surface normal of the display device 2, are at least partially compensated.

LIST OF REFERENCE SIGNS 1 camera
1.1 camera lens, imaging optics
1.2 sensor surface
1.3 sensor pixels
2 display device
2.1 display pixels
2.2 column
2.3 row
3 positioning unit
3.1 motor
3.2 holding plate
4 control unit
5 evaluation unit
$D_S$ sensor pixel pitch
$D_A$ display pixel pitch
$f_x, f_y$ horizontal, vertical spatial frequency
$|G_{\tau 2}(f_x, f_y)|$ amplitude response
$M_1, M_2$ first, second perturbations
O optical axis
S start position
V offset
V' image offset
VP offset path
VP' offset path image
$|X_{\tau 1}(f_x, f_y)|$ first magnitude plot
$|X_{\tau 2}(f_x, f_y)|$ second magnitude plot

What is claimed is:

1. A method for suppressing aliasing errors in a Moiré-corrected result image formed from at least one camera image,
   wherein by means of a camera comprising imaging optics and a sensor surface with sensor pixels the at least one camera image is recorded as an image of a display image of a display device with having display pixels arranged in a matrix-like manner and spaced apart at a display pixel pitch onto the sensor surface, wherein, during the recording of at least one camera image, at least one of the camera and the sensor surface is moved relative to the display device along at least one offset path starting from a start position assigned to the respective camera image, wherein a first, a second and at least one of a third and a further camera image are recorded, wherein
- the first and the second camera image are recorded as a respective image of structurally identical display images displayed by the same display device,
- during the recording of the first and the at least one third or further camera image, the camera is one of not moved and moved only slightly relative to the display device,
- during the recording of the second camera image, the camera is moved relative to the display device along at least one offset path,
- a first and a second magnitude response of respective Fourier transforms of the first and the second camera image are determined,
- the amplitude response of an offset filter is determined from the first and the second magnitude response,
- for the at least one of the third and the further camera image, the Fourier transform is determined in each case and multiplied in each case by the amplitude response of the offset filter and, from this
- a Moiré-corrected result image is determined by inverse Fourier transformation.

2. The method according to claim 1, wherein the camera is moved relative to the display device along at least one offset path starting from a start position assigned to the respective camera image during the recording of at least one camera image.

3. The method according to claim 1, wherein the first and second camera images are recorded from a first display device and each further camera image is recorded from a further display device, which is in each case identical in construction to the first display device and is arranged relative to the camera in the same position as the first display device.

4. The method according to claim 1, wherein a binary amplitude response is calculated from the quotient of the second magnitude response with respect to the first magnitude response by assigning the value 0 to the binary amplitude response if the quotient is below a predetermined threshold value, and by assigning the value 1 to the binary amplitude response if the quotient is above a predetermined threshold value or is equal to the predetermined threshold value.

5. The method according to claim 1, wherein the offset made along an offset path parallel to the sensor surface is at most five times the display pixel pitch.

6. The method according to claim 1, wherein in a teach-in step an offset amplitude matching a display device and a camera is determined such that at least one of the following conditions applies:
- a Moiré interference measure is below a predetermined Moiré threshold value, and
- a Moiré interference is minimized when the camera is moved around an offset path with an offset that is smaller than or equal to the offset amplitude during the recording of the at least one camera image.

7. The method according to claim 1, wherein in a teach-in step at least one offset path matching a display device and a camera is determined in such a way that at least one of the following conditions applies:
- a Moiré interference measure lies below a predetermined Moiré threshold value, and
- Moiré interference measure is minimized when the camera is moved along this offset path relative to the start position during the recording of at least one camera image.

8. The method according to claim 1, wherein in that for at least one camera image the camera is displaced perpendicularly to the display device.

9. The method according to claim 1, wherein at least one camera image is moved relative to a display image at least along a first offset path and a second offset path arranged symmetrically thereto.

10. The method according to claim 1, wherein a color-channel-related result image is determined for a plurality of color channels in each case by arranging a color filter between the display device and the sensor surface of the camera, a color-channel-related offset interval being determined for each color channel, and the color-channel-related result images being registered against one another.

11. A method for evaluating the display quality of a pixel-based display device wherein a Moiré-corrected result image is formed from at least one camera image recorded with a camera using the method according to claim 1, and the display quality is evaluated on the basis of the Moiré-corrected result image.

12. The method according to claim 11, wherein defective display pixels of the display device are at least one of detected and localized.

13. The method according to claim 11, wherein the local distribution of a photometric parameter across the display device is determined.

14. A device for carrying out a method according to claim 1, comprising a camera, a positioning unit, a control unit and an evaluation unit, wherein the positioning unit is set up to move the camera by an offset lying within the offset interval, and wherein the control unit is set up to trigger the recording of a camera image, and wherein the evaluation unit is set up to form a Moiré-corrected result image from at least one camera image using the method according to claim 1.

15. The device according to claim 14, wherein the control unit is set up for controlling the positioning unit and for triggering the recording of a camera image in a manner coordinated with the movement of the positioning unit.

16. The device according to claim 14, wherein the control unit and the evaluation unit are each designed as part of a control and evaluation unit.

17. The device according to claim 14, wherein the positioning unit is designed as a vibration unit and is arranged on a housing of the camera.

18. The device according to claim 14, wherein the camera is designed as a luminance measurement camera.

19. The method according to claim 13, wherein the photometric parameter is the luminance.

* * * * *